United States Patent [19]

McMaster

[11] Patent Number: 4,512,460

[45] Date of Patent: Apr. 23, 1985

[54] GLASS SHEET ROLLER CONVEYOR INCLUDING ANTIFRICTION DRIVE CHAIN

[75] Inventor: Ronald A. McMaster, Woodville, Ohio

[73] Assignee: Glasstech, Inc., Perrysburg, Ohio

[21] Appl. No.: 480,223

[22] Filed: Mar. 30, 1983

[51] Int. Cl.³ .............................................. B65G 13/07
[52] U.S. Cl. .................................................. 198/790
[58] Field of Search .............. 198/790, 781, 845, 838, 198/851, 779

[56] References Cited

U.S. PATENT DOCUMENTS

| | | | |
|---|---|---|---|
| 2,275,244 | 3/1942 | Bee et al. | 198/845 |
| 2,526,563 | 10/1950 | Keen | 198/790 |
| 3,806,312 | 4/1974 | McMaster et al. | 432/121 |
| 3,934,970 | 1/1976 | McMaster et al. | 432/121 |
| 3,947,242 | 3/1976 | McMaster et al. | 432/122 |
| 3,994,711 | 11/1976 | McMaster | 65/163 |
| 4,133,667 | 1/1979 | Nitschke | 65/163 |
| 4,233,053 | 11/1980 | Nitschke | 65/163 |
| 4,341,546 | 7/1982 | Nitschke et al. | 65/163 |
| 4,356,912 | 11/1982 | Nitschke | 198/790 |
| 4,458,809 | 7/1984 | White et al. | 198/790 |

FOREIGN PATENT DOCUMENTS 838579 5/1952 Fed. Rep. of Germany ...... 198/838

*Primary Examiner*—Joseph E. Valenza
*Assistant Examiner*—Kyle E. Shane
*Attorney, Agent, or Firm*—Brooks & Kushman

[57] ABSTRACT

A drive chain (38) disclosed is utilized with glass sheet processing equipment (10) to provide frictional driving of conveyor rolls (22) upon rolling movement of the drive chain over an associated support surface (30). Drive chain (38) includes antifriction rollers (40) supported for rolling movement on the support surface (30) and also includes interconnected links (42,44) supported by the antifriction rollers (40) for movement over the support surface in a spaced relationship and having upper surfaces (46) that support and frictionally drive the rolls. Connecting pins (48) interconnect the links and have opposite ends (50) respectively supported by an associated pair of the antifriction rollers (40). Chain links (42,44) are preferably arranged in a side-side relationship in alternating inboard and outboard pairs between the associated pair of antifriction rollers (40). The antifriction drive chain construction reduces friction to eliminate "stick-slip" motion and to also reduce power requirements.

7 Claims, 6 Drawing Figures

GLASS SHEET ROLLER CONVEYOR INCLUDING ANTIFRICTION DRIVE CHAIN

TECHNICAL FIELD

This invention relates to glass sheet processing equipment of the type including a roller conveyor having elongated rolls that extend transversely to the direction of conveyance to support glass sheets for the conveyance during the processing of the glass sheets.

BACKGROUND ART

Glass sheet processing equipment has previously utilized roller conveyors for conveying glass sheets horizontally during the particular type of processing to be performed. Such roller conveyors have previously been utilized with annealing lehrs, tempering furnaces, and quench units for tempering systems used to process flat glass as well as for heating furnaces used to heat glass sheets in preparation for bending with or without subsequent tempering. Until about ten years ago, glass sheet roller conveyors were almost all driven by chains or gears which necessitated the use of bearings for supporting the opposite ends of the conveyor rolls. Introduction of a glass sheet roller conveyor as disclosed by the patents discussed below provided frictional driving of the conveyor rolls and also eliminated the necessity for using journals to support the rolls as was necessary with prior glass sheet conveyors.

U.S. Pat. No. 3,806,312 discloses a glass sheet tempering system whose furnace includes a horizontal roller conveyor having a friction drive mechanism for driving rolls of the conveyor in order to provide conveyance of glass sheets over the rolls. The rolls of the conveyor span the gap between a pair of spaced horizontally extending surfaces over which driving reaches of a pair of continuous drive loops are respectively driven to support and frictionally drive the ends of the rolls. Both support surfaces are located within the heating chamber of the furnace and the drive loops utilized are solid steel belts which can withstand the high temperature present upon passage through the heating chamber. During operation of this drive mechanism, the driving reaches of the continuous drive loops are maintained taut so as to maintain the upper surfaces of the rolls in a single plane along which the glass sheets are conveyed over the rolls. Also, a coupling between a pair of drive sheaves that respectively drive the continuous pair of drive loops at one end of the system and adjustable supports for each of the sheaves provides coordinated driving thereof in a manner that ensures conveyance of the glass sheets in the direction intended with minimal lateral drift. Upon commercial introduction into the glass tempering industry about 10 years ago, this friction drive mechanism was accorded immediate recognition and is currently being utilized in glass tempering systems throughout the world.

U.S. Pat. Nos. 3,934,970 and 3,947,242 each disclose a glass tempering system including a furnace whose roller conveyor has the basic type of friction drive mechanism discussed above but with ends of the conveyor rolls projecting outwardly through side slots defined between upper and lower housings of the furnace. The continuous drive loops of the drive mechanism are driven over external support surfaces to support and frictionally drive the roll ends and thus operate at a much lower temperature than is the case when located within the heating chamber. The lower temperature involved with this external location facilitates the use of continuous chains for the drive loops as opposed to the solid steel belts that are utilized when the drive loops pass through the heating chamber. These chains have teeth that permit positive driving thereof by toothed sheaves associated therewith as opposed to depending on frictional wrap force about the sheaves as with the solid steel belts. Also, the chains can bend to a much smaller radius of curvature than the solid steel belts and thereby permit the use of smaller diameter sheaves.

U.S. Pat. No. 3,994,711 discloses another glass tempering system incorporating the type of friction drive mechanism discussed above but with the conveyor of the furnace driven in an oscillatory manner so as to oscillate a glass sheet or sheets being heated independently of a roller conveyor of the associated quench unit where the glass is subsequently tempered. During an index cycle, the furnace and quench unit conveyor are coupled to provide coordinated conveyance of a heated glass sheet or sheets from the furnace into the quench unit. A first electric motor drive mechanism of this system drives a roller conveyor of a load station as well as the roller conveyor of the furnace while a second electric motor drive mechanism drives a roller conveyor of an unload station as well as the roller conveyor of the quench unit. During oscillatory driving of glass being heated within the furnace and independent oscillation of glass being cooled within the quench unit, the roller conveyors of the load and unload stations are respectively uncoupled from the first and second electric motor drive mechanisms so as to permit loading of glass to be tempered at the load station and unloading of tempered glass at the unload station. The oscillatory driving of the furnace roller conveyor considerably shortens the length of the total system while still conveying the heated glass sufficiently fast to prevent sagging thereof between the spaced rolls of the conveyor.

U.S. Pat. Nos. 4,133,677 and 4,233,053 each disclose a glass sheet roller conveyor having a continuous drive loop mechanism of the type discussed above wherein two sheaves on which each drive loop is received are driven in opposite directions with different torques. Such a drive maintains a taut condition of the driving reach of the drive loop and thereby facilitates maintenance of the rolls driven thereby in proper alignment for conveyance of glass in a single plane.

U.S. Pat. No. 4,341,546 discloses a roll drive mechanism for a horizontal roller conveyor of glass sheet processing equipment wherein first and second continuous drive loops of the mechanism drive the conveyor rolls over associated lengths of the conveyor that are selectively adjustable to provide a desired transition between adjacent conveyor sections driven by the different drive loops. First and second electric motor drives respectively drive the first and second drive loops to provide synchronous or independent glass sheet conveyance over the different lengths of the conveyor. A pair of each of the first and second drive loops are preferably utilized with opposite ends of the conveyor rolls supported thereon and having driven and reduced sized portions that permit end-for-end roll repositioning to adjust the transition between the driving of the loops. The preferred construction of this drive mechanism utilizes chains as the drive loops with the roll ends projecting outwardly through side slots in an associated glass sheet heating furnace which is an application for which the drive mechanism has particular utility in providing conveyor roll driving to convey glass sheets.

With the type of friction drive mechanism involved with the patents discussed above, the drive loops moving over the associated support surfaces are resisted by sliding friction caused by the combined weights of the conveyed glass sheets, the rolls, and the chain itself. Such friction can be considerable with furnaces where the conveyor rolls are made of ceramic which is relatively heavy, especially in long furnaces with a large number of rolls. Also, because of the "stick-slip" phenomenon on long conveyors, the friction can vary at different locations along the length of the conveyor so as to stretch and shorten the drive loop in a manner that can inhibit uniform driving of all of the conveyor rolls at the same speed.

DISCLOSURE OF INVENTION

An object of the present invention is to provide improved frictional driving of a roller conveyor for glass sheet processing equipment by reducing the friction between a drive loop and an associate support surface.

In carrying out the above object, the invention is incorporated in glass sheet processing equipment including a roller conveyor having elongated rolls extending transversely to the direction of conveyance. A continuous drive loop of the conveyor has the rolls supported thereon for frictional driving and is movable over a horizontally extending support surface to drive the rolls. This continuous drive loop comprises an antifriction drive chain including antifriction rollers supported for rolling movement on the support surface. The drive chain includes interconnected links supported by the antifriction rollers for movement over the support surface in a spaced relationship to the support surface. Upper surfaces of the interconnected links support and frictionally drive the rolls upon the drive chain movement over the support surface.

In its preferred construction, the drive chain includes connecting pins that interconnect the links. Each connecting pin has opposite ends that are respectively supported by an associated pair of the antifriction rollers. Preferably, the links are arranged in pairs in a side-by-side relationship along the length of the chain. Alternate pairs of the chain links are positioned at outboard locations from the other alternate pair of chain links which are positioned at inboard locations. All of the links associated with each connecting pin are located between the pair of antifriction rollers that provide rolling movement thereof on the support surface.

Each connecting pin of the drive chain preferably includes a central drive member that is engaged by sprocket teeth to drive the chain. These drive members also maintain the inboard links in a laterally spaced relationship from each other along the length of the chain. Each connecting pin also includes a pair of clips that retain the associated pair of antifriction rollers. Washers of each connecting pin are interposed between the antifriction rollers and the outboard links, between the outboard and inboard links, and between the inboard links and the central drive member to facilitate pivoting of the links with respect to each other during movement between driving and return reaches of the drive chain.

In preferred construction of the drive chain, the links have elongated constructions including laterally disposed faces that engage the washers associated with the connecting pins. Each link has an upper edge that defines the upper surface for supporting and frictionally driving the rolls of the conveyor. The upper edge of each link has opposite ends including oppositely disposed chamfers for facilitating the chain movement below the rolls. Each link also has a lower edge that defines a lower surface which is spaced upwardly from the support surface over which the drive chain is driven.

The preferred construction of the glass sheet processing equipment incorporating the invention utilizes a pair of the continuous drive loops with an associated pair of spaced support surfaces over which the drive chains are driven. The elongated rolls of the conveyor extend transversely to the direction of conveyance and span the gap between the drive chains for frictional driving thereby upon movement of the drive chains over the support surfaces.

Each antifriction roller of the drive chains has an annular outer member supported for rolling movement on the associated support surface. Each antifriction roller also includes an annular inner member located within the outer member thereof and receiving the end of the associated connecting pin. Bearing elements of either the ball or roller type support the inner and outer members for rotation with respect to each other to permit the antifriction movement of the drive chain over its associated support surface.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
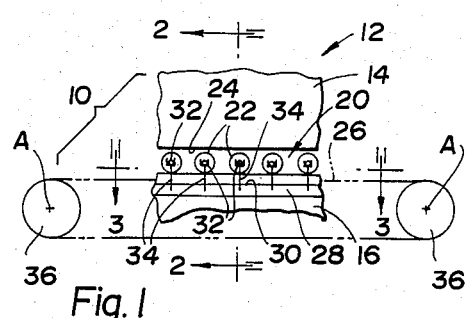
FIG. 1 is a schematic side elevation view illustrating glass sheet processing equipment including a roller conveyor having an antifriction drive chain constructed in accordance with the present invention.
Figure 2:
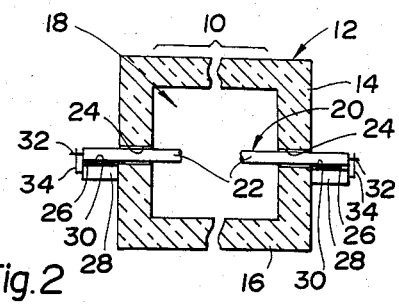
FIG. 2 is a cross-sectional view through the processing equipment incorporating the invention and is taken along the direction of line 2—2 in FIG. 1.

With reference to FIGS. 1 and 2 of the drawings, glass sheet processing equipment incorporating the invention is generally indicated by reference numeral 10 and is illustrated as a heating furnace 12 utilized to heat glass sheets in preparation for tempering or heat strengthening. However, it should be understood that the invention is also applicable to annealing lehrs as well as to quenches for tempering or heat strengthening glass sheets, etc.

Furnace 12 of the glass sheet processing equipment illustrated in FIGS. 1 and 2 includes upper and lower housings 14 and 16 defining a heating chamber 18 in which glass sheets are heated. A roller conveyor 20 of the furnace has elongated rolls 22 that extend transversely to the direction of conveyance to support glass sheets for movement through the furnace heating chamber 18 for heating to a sufficiently high temperature for bending and/or tempering etc. At each of its lateral sides, the furnace 12 includes a side slot 24 through which the adjacent ends of the conveyor rolls 22 project for frictional driving in accordance with the present invention.

As best illustrated in FIG. 1, each lateral side of the furnace 12 includes a continuous drive loop 26 and also includes an external support 28 having a horizontally extending support surface 30 that faces upwardly with the drive loops supported thereon for movement that frictionally drives the conveyor rolls 22. Central end pins 32 of the conveyor rolls 22 are received by longitudinal positioners 34 that project upwardly from the associated external support 28 to prevent movement of the conveyor rolls along the direction of conveyance during the frictional driving. Each drive loop 26 is received by an associated pair of drive sprockets 36 which are rotatable about axes A to provide the driving of the conveyor rolls. Counterclockwise driving of the left sprocket 36 pulls the upper driving reach of the drive loop 26 over the support surface 30 to thereby rotate the conveyor rolls 22 clockwise and effect conveyance of glass sheets from the left toward the right. During such driving, the lower return reach of the drive loop 26 moves from the left sprocket 36 toward the right sprocket after passing over the support surface 30 to drive the rolls. Similarly, right to left conveyance is effected by driving the right sprocket 36 in a clockwise direction.

Figure 3:
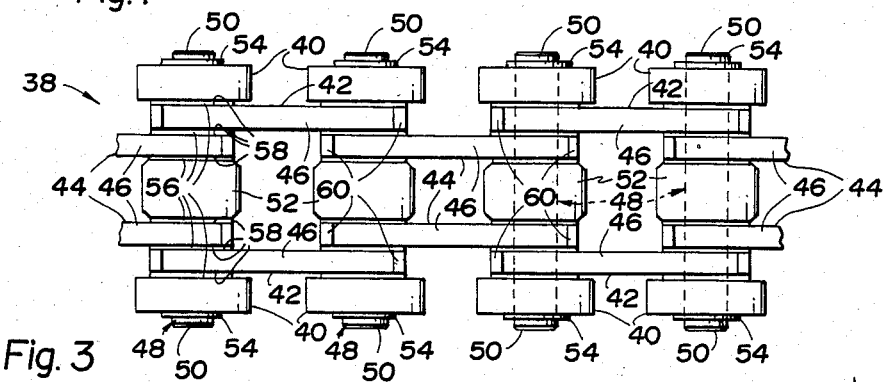
FIG. 3 is a top plan view of the drive chain taken along the direction of line 3—3 of FIG. 1.
Figure 4:
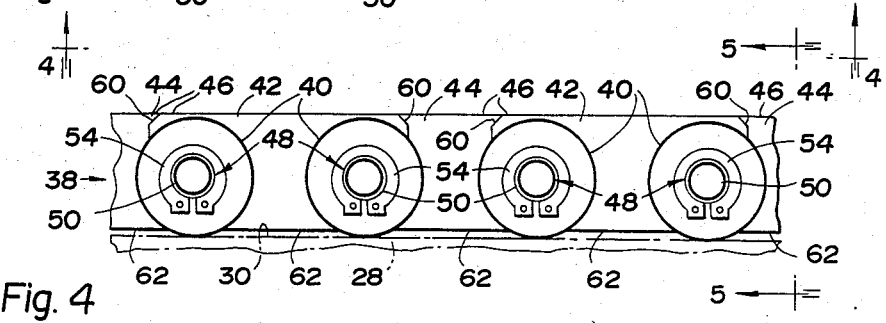
FIG. 4 is a side view of the drive chain taken along the direction of line 4—4 of FIG. 3.
Figure 5:
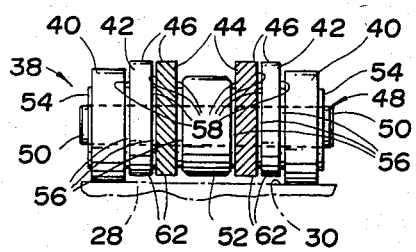
FIG. 5 is a cross-sectional view of the drive chain taken along the direction of line 5—5 of FIG. 4.

In accordance with the present invention, the continuous drive loop for providing the frictional driving is embodied by an antifriction drive chain 38 illustrated in FIGS. 3, 4, and 5. Drive chain 38 includes antifriction rollers 40 that are supported for rolling movement on the associated support surface 30 in a manner that reduces friction between the drive chain and the support surface during the frictional driving of the conveyor rolls. Drive chain 38 also includes interconnected links 42 and 44 which are supported by the antifriction rollers 40 for movement over the support surface 30 in a spaced relationship thereto such that no friction is generated between the chain links and the support surface. Each of the chain links 42 and 44 has an upper surface 46 for supporting and frictionally driving the conveyor rolls in the manner previously described.

Elimination of friction between the drive chain 38 and the associated support 30 during the frictional driving of the conveyor rolls reduces the driving force required to operate the conveyor. In addition, the antifriction movement of the drive chain 38 over the support surface 30 provides uniform speed in driving the conveyor rolls along the entire length of the conveyor, since friction does not build up at any position along the conveyor and cause stretching and subsequent contraction that can result in nonuniformity in the driving of the conveyor rolls.

With continuing reference to FIGS. 3 and 5, the antifriction drive chain 38 includes connecting pins 48 that interconnect the chain links 42 and 44 by extending through aligned holes in the links. Each connecting pin 48 has a pair of opposite ends 50 respectively supported by an associated pair of the antifriction rollers 40 for movement over the associated support surface 30 as previously described. Chain links 42 and 44 are arranged in pairs in a side-by-side relationship along the length of the chain. Alternating pairs of the chain links 42 are positioned at outboard locations from the other alternating pairs of chain links 44 which are positioned at inboard locations. All of the links 42 and 44 are located between the associated pair of antifriction rollers 40 that support the pin 48 connected thereto for movement over the support surface during the conveyor driving.

As seen in FIGS. 3 and 5, each connecting pin 48 includes a central drive member 52 that is engaged by teeth of the associated sprockets to provide driving of the chain. The central drive members 52 on each pin 48 also maintains the associated pair of inboard links 44 in a laterally spaced relationship from each other along the length of the chain. Drive members 52 have annular shapes with the connecting pins 48 extending therethrough and have outer diameters that are small enough so as not to touch the support surface 30 as illustrated in FIG. 5. Each connecting pin 48 also includes a pair of clips 54 that retain the associated pair of antifriction rollers 40 with the clips received within end grooves in the pin ends 50. Washers 56 are interposed between the antifriction rollers 40 and the outboard links 42, between the outboard and inboard links 42 and 44, and between the inboard links 44 and the central drive member 52. These washers 56 facilitate providing of the links 42 and 44 with respect to each other upon bending of the drive chain upon movement over the sprockets 36 shown in FIG. 1 as the sprocket teeth engage the drive members 52.

Each of the drive chain links 42 and 44 illustrated in FIGS. 3 through 5 has an elongated plate construction and includes laterally disposed faces 58 that engage the washers 56 as illustrated in FIGS. 3 and 5. Each platelike link 42 and 44 has an upper edge that defines the upper surface 46 thereof for supporting and frictionally driving the conveyor rolls. The upper edge of each link 42 and 44 has opposite ends 60 that are chamfered to facilitate the chain movement below the rolls. Each link 42 and 44 also has a lower edge which defines a lower surface 62 that is spaced upwardly from the support surface 30 as illustrated in FIGS. 4 and 5 to permit the antifriction movement of the drive chain over the support surface.

Figure 6:
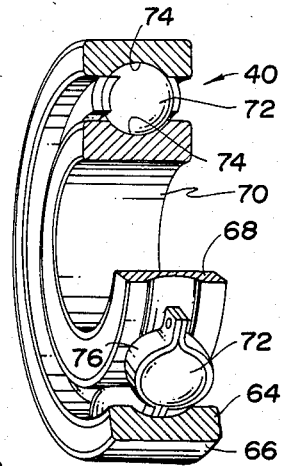
FIG. 6 is a cutaway perspective view illustrating rollers of the drive chain.

With reference to FIG. 6, each antifriction roller 40 has an annular outer member 64 whose round outer surface 66 rolls over the associated support surface during the movement of the drive chain. An annular inner member 68 of each antifriction roller 40 is received within the outer member 64 thereof and has a central round hole 70 that receives and supports the associated connecting pin end 50 with this pin end projecting just outwardly therefrom to be secured by the retaining clip 54 which engages the inner member. Bearing elements 72 which are illustrated in FIG. 6 as being of the ball type are received between the outer and inner members 64 and 68 within grooves 74 thereof and are positioned circumferentially by a cage 76 in order to provide antifriction support between the members during the chain movement. It should be understood that while the bearing elements 72 are illustrated as balls, it is also possible to use roller elements as well. Furthermore, suitable seals may be provided on the opposite sides of each roller 40 extending between the outer and inner members 64 and 68 thereof to prevent dirt and accumulation etc. from interfering with the antifriction operation of the roller.

While the best mode for carrying out the invention has been described in detail, those familiar with the art to which this invention relates will recognize various alternative designs and embodiments for practicing the invention as defined by the following claims.

What is claimed is:

1. In glass sheet processing equipment including a roller conveyor having elongated rolls extending transversely to the direction of conveyance, a continuous drive loop on which the rolls are supported for frictional driving, and a horizontally extending support surface on which the drive loop is supported and moved to drive the rolls, the continuous drive loop comprising: an antifriction drive chain including antifriction rollers each of which has an annular outer member supported for rolling movement on the support surface; each antifriction roller also including an annular inner member located within the outer member thereof and further including bearing elements that support the inner and outer members for rotation with respect to each other; the antifriction rollers being arranged in laterally aligned pairs spaced along the length of the drive chain; the drive chain including connecting pins each of which has opposite ends received by the inner members of an associated pair of the laterally aligned antifriction rollers; the drive chain including links extending between the connecting pins and spaced upwardly from the associated support surface in a spaced relationship thereto; and each link having an upper surface that supports and frictionally drives the rolls as the antifriction rollers support the chain for movement on the associated support surface.

2. A drive chain as in claim 1 wherein the links are arranged in pairs in a side-by-side relationship along the length of the chain, alternating pairs of the chain links being positioned at outboard locations from the other alternating pairs of chain links which are positioned at inboard locations, and all of the links associated with each connecting pin being located between the associated pair of antifriction rollers that provide rolling movement thereof on the support surface.

3. A drive chain as in claim 2 wherein each connecting pin includes a central drive member, and each connecting pin including a pair of clips that retain the associated pair of antifriction rollers.

4. A drive chain as in claim 3 wherein each connecting pin includes washers interposed between the antifriction rollers and the outboard links, between the outboard and inboard links, and between the inboard links and the central drive member.

5. A drive chain as in claim 4 wherein the links have elongated plate constructions including laterally disposed faces that engage the washers, each link having an upper edge that defines the upper surface thereof for supporting and frictionally driving the rolls, and the upper edge of each link having opposite ends including oppositely disposed chamfers for facilitating the chain movement below the rolls.

6. In glass sheet processing equipment including a roller conveyor having elongated rolls extending transversely to the direction of conveyance, a pair of continuous drive loops on which opposite ends of the rolls are respectively supported for frictional driving, and a pair of spaced support surfaces that extend horizontally with the drive loops respectively supported for movement thereon to drive the rolls, each continuous drive loop comprising: an antifriction drive chain including antifriction rollers each of which has an annular outer member supported for rolling movement on the associated support surface; each antifriction roller also including an annular inner member located within the outer member thereof and further including bearing elements that support the inner and outer members for rotation with respect to each other; the antifriction rollers being arranged in laterally aligned pairs spaced along the length of the drive chain; the drive chain including connecting pins each of which has opposite ends received by the inner members of an associated pair of the laterally aligned antifriction rollers; the drive chain including links extending between the connecting pins and spaced upwardly from the associated support surface for movement thereon by the rolling of the antifriction rollers; and each link having an upper surface that supports and frictionally drives the rolls as the antifriction rollers support the chain during movement on the associated support surface.

7. In glass sheet processing equipment including a roller conveyor having elongated rolls extending transversely to the direction of conveyance, a pair of continuous drive loops on which opposite ends of the rolls are respectively supported for frictional driving, and a pair of spaced support surfaces that extend horizontally with the drive loops respectively supported for movement thereon to drive the rolls, each continuous drive loop comprising: an antifriction drive chain including antifriction rollers each of which has an annular outer member supported for rolling movement on the associated support surface; each antifriction roller also including an annular inner member located within the outer member thereof and further including bearing elements that support the inner and outer members for rotation with respect to each other; the antifriction rollers being arranged in laterally aligned pairs spaced along the length of the drive chain; the drive chain including connecting pins each of which has opposite ends received by the inner members of an associated pair of the laterally spaced antifriction rollers; the drive chains including inboard and outboard pairs of links extending between the connecting pins; each connecting pin being connected to one of the inboard pairs of links and to one of the outboard pairs of links; a central drive member on each connecting pin for maintaining the pair of inboard links connected thereto in a spaced relationship from each other; each link having a lower surface spaced upwardly from the associated support surface such that the links are supported for movement thereon by the rolling of the antifriction rollers; and each link having an upper surface that supports and frictionally drives the rolls as the antifriction rollers support the chain during movement on the associated support surface.

* * * * *

UNITED STATES PATENT AND TRADEMARK OFFICE
CERTIFICATE OF CORRECTION

PATENT NO. : 4,512,460

DATED : April 23, 1985

INVENTOR(S) : Ronald A. McMaster

It is certified that error appears in the above-identified patent and that said Letters Patent is hereby corrected as shown below:

Column 6, line 24, "providing" should be --pivoting--.

Signed and Sealed this

Twenty-second Day of October 1985

[SEAL]

Attest:

DONALD J. QUIGG

Attesting Officer

Commissioner of Patents and Trademarks—Designate